April 9, 1940.  H. W. KOST  2,196,312
SHEET METAL NUT
Filed June 18, 1938
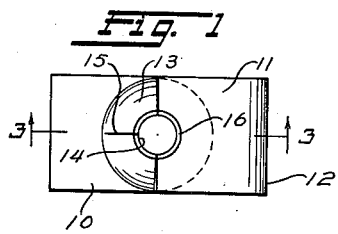
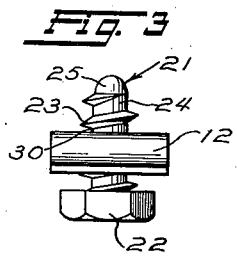
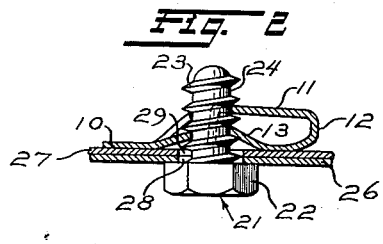
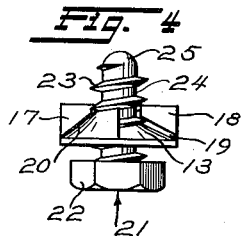
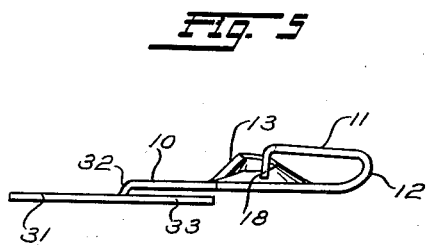
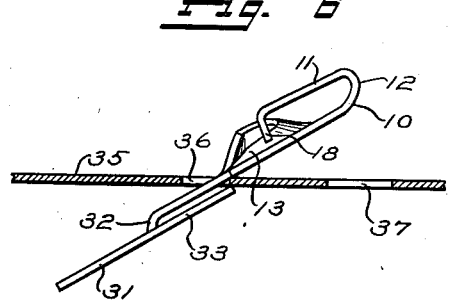
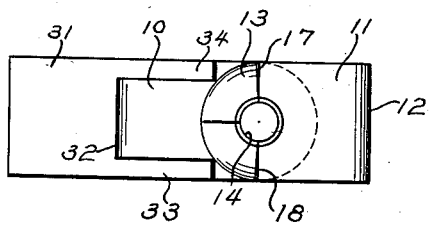
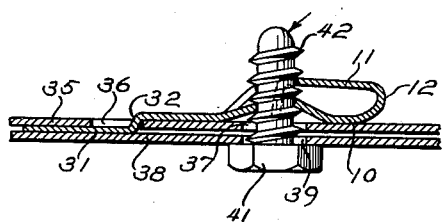
Inventor
Harold W. Kost
By Strauch & Hoffman
Attorneys Patented Apr. 9, 1940

2,196,312

UNITED STATES PATENT OFFICE 2,196,312

SHEET METAL NUT

Harold W. Kost, Detroit, Mich., assignor to Prestole Devices, Inc., Detroit, Mich., a corporation of Michigan Application June 18, 1938, Serial No. 214,536

9 Claims. (Cl. 85—32)

The present invention relates to sheet nuts of the type that automatically provides a locked engagement between the bolt and the nut when the bolt is drawn taut. More particularly, the invention is concerned with a self-locking sheet metal nut having an overhanging portion overlying the body of the nut, said portion adding great strength to the nut as well as a control for the locking action thereof.

Sheet metal nuts heretofore proposed generally fixedly engage only a single convolution of the thread of the associated bolt, and, accordingly, the bolt and nut combination possesses a strength that is no greater than either the resistance to shearing of the single thread convolution of the bolt, or to shearing or bending of the thread on the nut.

The primary purpose of the present invention is to provide a sheet metal nut that is designed to fixedly engage several thread convolutions of the bolt, and to so form the nut structure that the several threads, or part threads formed thereon, have great resistance against undesired bending or shearing when the bolt is drawn so as to very tightly clamp the part or parts secured by the bolt and nut.

Another object of the invention is to provide a sheet metal nut having a single complete self-locking thread and a sheet metal portion overlying the part of the nut that contains said thread, and engaging in the groove beyond that received by said thread, in which the overhanging portion is provided with stop means to definitely limit the bending of said portion upon tightening of the bolt in the nut, and thus resisting movement of the bolt beyond that desirable to bring about a firm frictional engagement between the self-locking thread and the bolt shank.

Still further objects of the invention will appear as a description thereof proceeds with reference to the accompanying drawing in which:

Figure 1 is a plan view of a sheet metal nut including the present invention;

Figure 2 is a sectional view showing a bolt associated with the nut of Figure 1 and clamping two sheet metal structures together;

Figures 3 and 4 are end elevational views of the nut of Figure 1 having a bolt associated therewith;

Figure 5 is an edge elevational view of a sheet metal nut of the present invention having means to secure it to a sheet metal structure;

Figure 6 is a fragmentary sectional view showing how the structure of Figure 5 is associated with a sheet metal structure;

Figure 7 is a plan view of the structure illustrated in Figure 5; and

Figure 8 is a sectional view showing the nut of Figures 5, 6 and 7 associated with a sheet metal structure, and with a bolt clamping a further sheet metal member against said structure.

Like reference characters indicate like parts throughout the several figures.

Referring to form of the invention illustrated in Figures 1, 2, 3 and 4, the sheet metal nut there shown consists of a body portion 10, and a portion 11 overhanging said body portion, the latter portion being formed by bending one end of a narrow strip of sheet metal of proper thickness into substantially parallel relation to the body portion 10, by an open return bend indicated at 12. The body portion 10 is provided with a protuberance 13 having an opening 14 formed in the top thereof. A slit 15 extends radially of the opening 14. In the form of the invention illustrated in Figures 1 to 4, inclusive, said slit is shown extending to the body of the nut, though it may be shorter than as illustrated, if desired, the purpose of said slit being to permit the passage of the thread of the bolt as hereinafter pointed out. The metal of the protuberance 13 adjacent the opening 14 is shaped to provide a helical thread corresponding to the pitch of the screw for use with which the nut is designed. The low point of the single thread thus formed is located at one side of the slit 15, while the high point thereof is located at the other side thereof, as clearly illustrated in Figure 4.

Preferably the edges of the protuberance merge into the plane of the body 10 of the nut on a smooth concave curve, it having been found in actual practice that when the protuberance is formed in this way the most desirable and effective self-locking action is provided as hereinafter more fully described. Preferably the single thread provided by the wall of the opening 14 in the protuberance 13 is formed so that the lowest point of said thread is substantially spaced above the plane of the body 10 of the nut, permitting ample clearance beneath the thread to permit it to be moved toward the structure upon which it rests when the self-locking action presently to be referred to takes place. The spacing of the low point of said thread is preferably made equal to or greater than the thickness of the metal strip from which the nut is constructed.

or at least as great as the pitch of the bolt for which the nut is designed.

The overhanging portion of the nut is provided with a notch 16, preferably of semi-circular form, having a radius substantially equal to the radius of the bolt, with which the nut is to be used, at the bottom of the usual spiral groove formed therein. A triangular stop lug 17 is bent downward from the overhanging portion 11 toward the body of the nut 10 at one side of the notch 16, while a similar stop lug 18 is bent downwardly toward the body of the nut at the other side of the notch 16. The edges of the stop lugs 17 and 18 adjacent the body of the nut conform approximately to the shape of the conical protuberance which they overlie.

The edge of the stop lug 18 is substantially spaced from the conical protuberance 13 as indicated at 19 in Figure 4. The edge of the stop lug 17 is spaced only slightly from said conical protuberance as also clearly shown in Figure 4. The purpose of the spacing just referred to will presently be described.

It is essential that the bolt 21 for the nut just described have a pitch exceeding the thickness of the sheet metal from which the nut is constructed so that the entire thickness of the self-locking thread, provided on the edge of the opening 14 in the conical protuberance 13, may be completely received in the groove of the bolt shank. Such a bolt is illustrated in the drawing and includes a head 22 and a thread 23 having a pitch substantially exceeding the thickness of the sheet metal from which the nut is constructed, thus providing a groove 24 in the shank 25 of the bolt of substantial width.

The operation of the nut just described is as follows: Referring to Figure 2 in which the nut and bolt 21 are employed in clamping two sheet metal structures 26 and 27 together, said structures are provided with openings 28 and 29, respectively, which are aligned for the passage of the shank of the bolt and are of such size as to permit said shank to pass freely therethrough into threaded engagement with the nut constituting the present invention. In engaging the nut with the shank of the bolt, said shank is turned through the opening 14 in the protuberance 13, the edge of said opening serving as a complete thread. In threading the bolt into the nut the notch 16 in the overhanging portion 11 will engage in the groove of the bolt beyond that which receives the thread formed by the edge of the opening in the protuberance. Before tightening the bolt the overhanging portion 11 is spaced from the thread that overlies it as indicated best by 30 in Figure 3 of the drawing. As the bolt is drawn taut, the portion of the thread 23 thereof that overlies the conical protuberance serves to flatten said protuberance effecting a self-locking action by partially closing the opening 14 around the shank of the bolt at the base of the thread as described in Patent No. 2,081,065, granted May 18, 1937. As the protuberance is flattened, the convolution of the thread that overlies the overhanging portion 11 bears upon said portion moving it downward toward the body 10 of the nut until the stop lugs 17 and 18 contact with the underlying portion of the body of the nut. The greater clearance beneath the stop lug 18 permits the overhanging portion to be inclined under the action of the bolt to contact a substantial portion of the thread overlying said overhanging portion. After the stop lugs 17 and 18 are in contact with the body of the bolt, further turning movement of the bolt can not occur without stripping the threads of the bolt. The overhanging portion, and the stop lugs carried thereby, accordingly serve to limit the extent to which the conical protuberance may be depressed, and the overhanging portion thus provides an additional part thread to engage the convolution of the bolt thread beyond that engaged by the convolution that overlies the top of the conical protuberance thus greatly increasing the strength of the nut and bolt combination. Just sufficient movement of the overhanging portion 11 towards the body is permitted to bring about a sufficient flattening of the protuberance under the action of the bolt to insure a firm frictional locking engagement between the edge of the thread provided by the opening in the protuberance and the shank of the bolt. By thus limiting the extent by which the protuberance can be flattened, liability of stripping the thread of the bolt by turning it beyond the point necessary to bring about an effective locking action is minimized. However, if the thread which engages the conical protuberance, and brings about the locking action, should be stripped, the notch in the overhanging portion 16 will serve as a pilot engaging the next groove of the bolt permitting it to be screwed out of engagement with the nut and replaced by a bolt having a complete thread.

It will be understood further that in order that the bolt can be turned into the nut, a suitable wrench or tool is used to hold the nut from rotation, or the bolt can be held from turning and the nut screwed thereon by means of the wrench or tool in the conventional manner.

In the form of the invention illustrated in Figures 5, 6, 7 and 8, the nut already described is provided with means to attach it to a structure which is to be secured by a bolt. To this end the body 10 is provided with an extension 31, preferably of the same width as the body. Said extension is connected to the body 10 by an offset 32. Tongues 33 and 34, also separated from the body 10 by slits, also form a part of the attaching means, said tongues being disposed in the plane of the extension 31 as illustrated.

In the use of this modification of the present invention, the structure 35 to which the nut is to be applied is provided with an opening 36 permitting the nut to be passed therethrough from one side of the structure 35 to the other, and an opening 37 arranged so that when the nut is in position, it will be in registry with the opening 14 in the protuberance of the nut. The opening 37 is of such size as to permit the bolt to freely pass therethrough and may be made of such size that accurate registry of the opening in the protuberance 13 with the opening 37 is not necessary.

The nut is applied to the structure 35 as is clearly illustrated in Figure 6 of the drawing, which shows the nut being passed through the opening 36. After it is brought into the position illustrated in this figure, it is rocked about the corner of the opening 36, with which it is in contact, and the tongues 33 and 34 are engaged beneath the structure 35 bringing the nut in the position illustrated in the assembly view of Figure 8. It will be understood that the tongues will bend sufficiently to permit the interlocked engagement between the nut and the structure 35 to be brought about.

In Figure 8 the structure 35 with the nut applied thereto is shown secured to another sheet metal structure 38 having an opening 39 aligned with the opening 37 by means of a bolt 40 having a head 41 and a thread 42 of the character already described formed on the shank thereof. The structure 38 may be the fender of an automobile, for example, while 35 may be a part of the metal body. By applying nuts to the sheet metal body in the manner just described, said body is conveniently provided with self-locking means to engage the threaded shank of the bolt that serve to secure the fender to the body. Of course, the invention may be used for many other purposes, the securing of a fender to a sheet metal automobile body being referred to here merely by way of example, and because the device of the present invention has gone to wide use for this specific purpose.

It will be understood that, in the form of the invention just described, the threaded shank of the bolt cooperates with the self-locking thread of the body 10 and the overhanging portion 11 and the stop lugs depending therefrom completely described with reference to the form of the invention illustrated in Figures 1 to 4, inclusive. It will be understood that, while Figures 5, 6, 7 and 8 illustrate a nut provided with one way of attaching it to a sheet metal structure, other ways of attaching the same nut to the structure may readily be devised and are contemplated as coming within the scope of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A sheet metal fastening device, comprising a conical protuberance having an opening in the top thereof the edge of the wall of which provides a thread, an integral projection overhanging said protuberance and provided with a notch to engage in the groove of the threaded element for the fastening device beyond the groove that receives said edge, and means formed as an integral part of said projection to act as a stop to limit the flattening of said protuberance.

2. A sheet metal structure for receiving a threaded element, comprising a member having a self-locking thread, integral means overhanging the thread and provided with a notch to engage in the groove of the threaded element beyond that receiving the self-locking thread in the member, and stops formed on said means at the sides of said notch for engaging the surface of said member adjacent the self-locking thread whereby the sheet metal structure is strengthened to withstand increased tightening forces.

3. A sheet metal nut comprising a body providing a thread, means overhanging said body and having a notch therein for engaging in the groove of the threaded element for said nut beyond that engaged by said thread, and means formed as an integral part of said first-mentioned means extending toward said body to limit the movement of said means toward said body.

4. A sheet metal nut, comprising a strip of metal consisting of a body and a part projecting out of the plane of said body and having a self-locking thread therein, means to engage a thread of a threaded element beyond the thread engaged by the self-locking thread, and stop means formed on said means for engaging the upper surface of said part adjacent the self-locking thread whereby said nut permits the application of increased tightening forces.

5. A sheet metal nut having a portion providing a thread and an integral projection overhanging said portion having a notch to engage the threaded element for the nut beyond the thread in said portion, an integral body portion on said nut for attaching the nut to a structure engaged thereby, and means integral with said projection engaging said portion adjacent the threaded opening therein for reinforcing the nut whereby increased tightening forces may be applied to said threaded element.

6. A sheet metal nut for engagement by a threaded element comprising a sheet metal part provided with a protuberance having an opening shaped to provide a helical thread for engagement with said element, a portion offset from the plane of said part in a plane parallel thereto, two tongue-like portions projecting laterally of said part, and in the plane thereof on opposite sides of said part to provide a space between said tongues and said part sufficient to receive a portion of the structure to which the nut is to be secured, an integral projection overhanging said part and providing a notch to engage the threaded element beyond the part, and stops integral with said projection for engaging said part adjacent said thread to limit the extent of flattening of said protuberance.

7. A sheet metal nut, comprising a body having a protuberance therein provided with an opening, the edge of said opening being shaped to provide a thread for a bolt, a portion formed integrally with said body and return-bent to overhang said protuberance, an opening in said portion aligned with said first-named opening, and lug means depending from said portion toward said body.

8. A sheet metal nut, comprising a body having a protuberance therein provided with an opening, the edge of said opening being shaped to provide a thread for a bolt, a portion formed integrally with said body and return-bent to overhang said protuberance, an opening in said portion aligned with said first-named opening, lug means depending from said portion toward said body, and means formed as a part of said body to attach said nut to the structure with which it is to be used.

9. A sheet metal nut, comprising a body having a protuberance therein provided with an opening, the edge of said opening being shaped to provide a thread for a bolt, a portion formed integrally with said body and return-bent to overhang said protuberance, an opening in said portion aligned with said first-named opening, and a pair of lugs normally spaced differently from said body depending from said portion toward said body, said lugs permitting only limited movement of said portion toward said body.

HAROLD W. KOST.

DISCLAIMER 2,196,312.—*Harold W. Kost*, Detroit, Mich. SHEET METAL NUT. Patent dated April 9, 1940. Disclaimer filed August 4, 1941, by the assignee, *Detroit Harvester Company*.

Hereby enters this disclaimer to claims 1, 2, 3, 4, 7, and 8 of the specification.

[*Official Gazette August 26, 1941.*]